No. 758,509. PATENTED APR. 26, 1904.
W. R. CLARK.
COMBINED HAT, COAT, AND UMBRELLA RACK.
APPLICATION FILED JUNE 5, 1903.
NO MODEL.
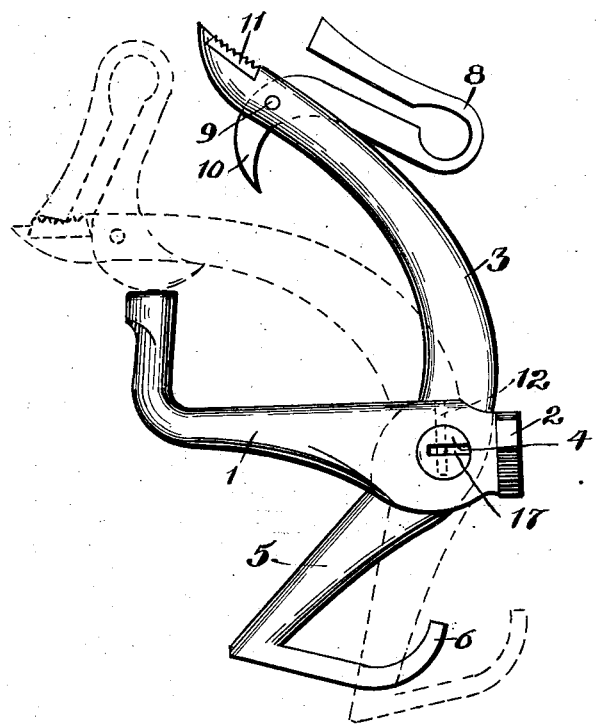
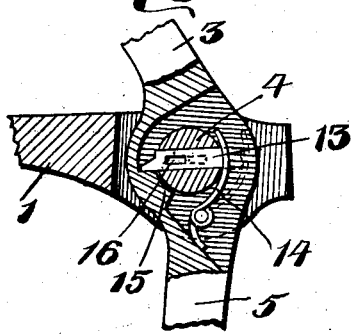
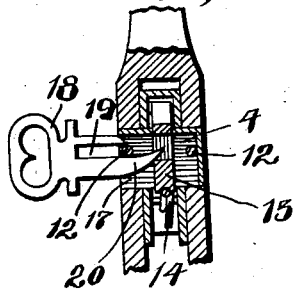
Witnesses
Inventor
William R. Clark,
by Henry ... Attorneys
THE NORRIS PETERS CO., PHOTO-LITHO., WASHINGTON, D. C.

No. 758,509.

Patented April 26, 1904.

UNITED STATES PATENT OFFICE.

WILLIAM R. CLARK, OF CINCINNATI, OHIO.

COMBINED HAT, COAT, AND UMBRELLA RACK.

SPECIFICATION forming part of Letters Patent No. 758,509, dated April 26, 1904.

Application filed June 5, 1903. Serial No. 160,231. (No model.)

*To all whom it may concern:*

Be it known that I, WILLIAM R. CLARK, a citizen of the United States, residing at Cincinnati, in the county of Hamilton and State of Ohio, have invented certain new and useful Improvements in a Combined Hat, Coat, and Umbrella Rack, of which the following is a specification, reference being had to the accompanying drawings.

This invention has relation to lock hat, coat, and umbrella racks; and it consists in the novel construction and arrangement of its parts, as hereinafter shown and described.

The object of the invention is to provide a device of the character as described, consisting of a hook adapted to be secured to the wall or other stationary object, said hook adapted to hold the coat and being provided with a bail pivotally attached thereto and adapted to swing down over the end of the hook, a locking mechanism being located at the pivotal point between said bail and said hook. The shank of said bail is provided with a claw adapted to hold an umbrella or cane and adapted to come in contact with the wall, thereby retaining the said article when the bail is locked. The said bail is provided at its upper end with a supplemental pivoted bail, which is adapted to grip the edge of a hat when first said bail is locked.

In the accompanying drawings, Figure 1 is a side elevation of the device. Fig. 2 is a vertical sectional view of the locking mechanism. Fig. 3 is a horizontal sectional view of the locking mechanism, and Fig. 4 is a perspective view of the claw used on the shank of the bail.

The hook 1 is provided with the perforated lugs 2, by means of which the said hook may be screwed or bolted to the wall or other support. The bail 3 is mounted upon the pivot 4, and is thereby secured to the said hook 1. The said pivot 4 is provided with a locking mechanism, which will be hereinafter explained. The shank 5 of the bail 3 extends below the hook 1 and is provided at its lower end with a claw 6, which extends at an angle to the longitudinal axis of the said shank 5. The inner ends of the said claw 6 are curved up, as shown, and are adapted to come in contact with the wall or other support when the bail 3 is in locked engagement with the hook 1. Before assuming this position, however, the head of a cane or umbrella may be inserted in the space between the ends of the claw, and when the said claw is swung back against the wall the said article cannot be removed from the device. The upper end of the bail 3 extends over the outer end of the hook 1. The said upper end of the bail 3 is provided with a supplemental bail 8, which is pivotally attached at the point 9 to the said bail 3. The shank 10 of the bail 8 passes below the lower edge of the bail 3 and is adapted to come in contact with the end of the hook 1. When the bail 3 is in the open position, as shown in heavy lines in Fig. 1, the bail 8 is in the position as shown in heavy lines in said figure; but when the bail 3 is swung down into the position as shown in dotted lines in Fig. 1 the curved under edge of the shank 10 of the bail 8 comes in contact with the end of the hook 1 and the bail 8 is swung up on its pivotal point 9 into the position as shown in dotted lines in said figure, the forward end of said bail coming in contact with the cushion 11, located upon the upper side and at the end of the bail 3. Previous to bringing the parts into the positions as shown in dotted lines the collar of a coat may be slipped over the end of the hook 1 and a hat may be hung upon the end of the bail 3, the brim of the said hat extending up within the sides of the bail 8. Thus the hat and coat are both held by the device. The pivot 4 is rigidly held with relation to the hook 1 by the pins 12 12, said pivot having a bolt 13 extending through the same. The spring 14 is attached to the bail 3 and bears against the end of the bolt 13 and has a tendency to hold said bolt within the pivot 4. The interior of the bail 3 adjacent the orifice for the reception of the pivot 4 is provided with a lug 15, the space above which is adapted to receive the inner end of said bolt 13 when the parts are in locked position. The bolt 13 is also provided with a key-aperture 16, which registers with the key-aperture 17 in the end of the pivot 4. The key 18 is provided with a slot 19, which is adapted to receive the pin 12 when the key is inserted in the aperture 17. Said key is also provided with a prong 20, having a beveled end which is adapted to enter the aperture 16 of the bolt 13 and press said bolt back against the tension of the spring 14, and thus withdraw the inner end of the bolt within the pivot 4, when the upper end of the bail 3 may be swung back, which will carry the lug 15 over the bolt-aperture of the pivot 4, and thus said bolt may be held back in the pivot 4. When the key 18 is withdrawn, the articles to be secured may be placed upon the device and the upper end of the bail 3 swung down. As soon as the lug 15 passes below the bolt 13 the spring 14 forces the said bolt out over the lug 15 and the parts are automatically locked and the articles securely held.

Having thus described my invention, what I claim as new, and desire to secure by Letters Patent, is—

1. A device of the character as described consisting of a hook, a bail pivoted to said hook, a supplemental bail pivoted to the first said bail and adapted to impinge an article between itself and the first said bail and a means for holding the parts in locked position with relation to each other.

2. A device of the character as described consisting of a hook, a bail pivoted to said hook, a supplemental bail pivoted to the first said bail and adapted to impinge an article between itself and the first said bail and having a depending shank adapted to come in contact with the hook and a means for holding the parts in locked position.

3. A device of the character as described consisting of a hook, a bail pivoted to said hook, a supplemental bail pivoted to the first said bail, the ends of the said bails adapted to be brought together and a means for holding the parts in locked position with relation to each other.

4. A device of the character as described consisting of a hook, a bail pivoted to said hook, a supplemental bail pivoted to the first said bail and having a depending shank adapted to come in contact with the hook, the ends of said bails adapted to be brought together and a means for holding the parts in locked position with relation to each other.

In testimony whereof I affix my signature in the presence of two witnesses.

WILLIAM R. CLARK.

Witnesses:
WALTER M. GOODWIN,
M. F. KUEHNEL.